Feb. 28, 1950        L. R. WHITE        2,499,123
CLOTHESLINE REEL
Filed Feb. 25, 1946
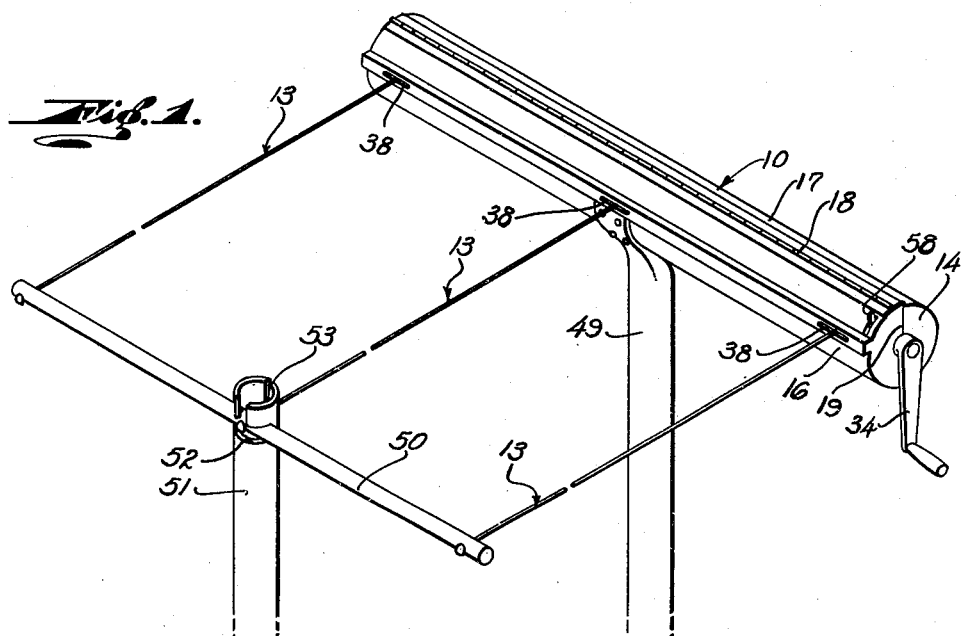
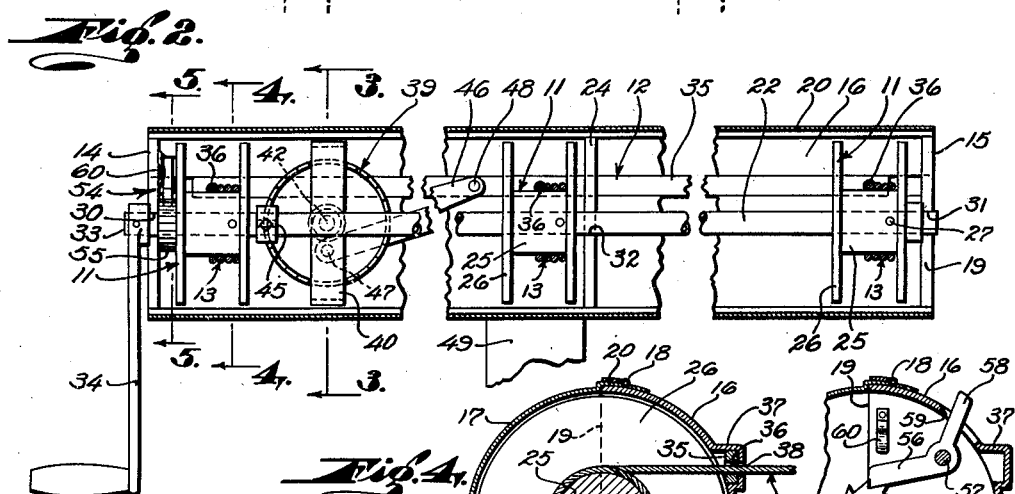
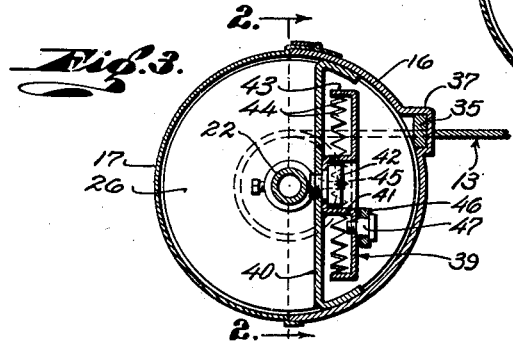
LEO RAYMOND WHITE
INVENTOR.
ATTORNEY Patented Feb. 28, 1950

2,499,123

UNITED STATES PATENT OFFICE 2,499,123

CLOTHESLINE REEL

Leo Raymond White, Long Beach, Calif.

Application February 25, 1946, Serial No. 650,037

7 Claims. (Cl. 242—100)

This invention has to do generally with improved apparatus for reeling and housing clotheslines. Particularly the invention aims to provide a clothesline reel that is adapted simultaneously to reel-in a plurality of lines uniformly so that all lines are wound at a uniform rate.

One object of the invention is to provide a guide for a plurality of lines that simultaneously gives the lines the same change in position on their respective reels to insure uniform winding of the lines with resultant simultaneous finish.

Another feature of the invention is the provision of a positive guide for the several lines that is operable by virtue of rotation of the winding reels to permit the maximum length of line to be wound uniformly on the reels.

A further object of the invention is to provide a line carrying reel housing of rigid tubular cross-section that effectively protects the line against exposure to moisture and dirt. Desirably the housing is split axially into two sections hinged together for convenience of assembly and maintenance. The use of a cylindrical housing has certain additional structural and functional advantages in that the housing acts as a line retainer for reels by receiving the reels with slight clearance at their peripheries.

The foregoing embodiments of the invention will be more clearly understood from the following detailed description throughout which reference is had to the accompanying drawing, in which:

Fig. 1 is a perspective view of the improved clothesline and reeling mechanism provided by the invention;

Fig. 2 is a longitudinal sectional view taken on line 2—2 of Fig. 3 showing the line reeling and housing for the same;

Fig. 3 is a transverse sectional view taken on line 3—3 of Fig. 2;

Fig. 4 is a transverse sectional view taken on line 4—4 of Fig. 2; and

Fig. 5 is a fragmentary sectional view taken on line 5—5 of Fig. 2.

The invention is directed primarily to the reeling mechanism for simultaneously winding a plurality of lines and for housing the same, and includes generally an elongated tubular body 10 for housing and rotatably supporting a plurality of line carrying reels 11, and a line spooling guide 12 for uniformly winding the lines 13 on their reels.

The body 10 as illustrated in the drawings is in the form of an elongated tubular section having closed ends 14 and 15. It is preferred to split the body 10 in the vertical plane of line 19, axially into two sections. The section 16 is provided to support and carry the various parts of the mechanism, while section 17 acts primarily as a cover for the section 16 and is hinged thereto by connection 18. It is contemplated that the supporting section 16 may be formed of a relatively heavier material than the cover section 17, since the load on the lines is entirely taken by the section 16. Section 17 of the body has overlapping parts 20 and 21 at the upper and lower sides of the body, respectively, to provide a water-tight seal for the body.

The line carrying reels 11 are fixed in spaced relation to a common shaft 22 journaled for rotation within openings 30 and 31 in ends 14 and 15 and opening 32 in the center partition 24, in alinement with the longitudinal axis of the body 10. The reels are each provided with a hub 25 and side flanges 26 for retaining the lines 13 wound upon them and are preferably formed of wood or the like, to absorb moisture and prevent rusting. Screw 27, threaded through opening 28 in the hub 25 of each reel and registering opening 29 in the shaft 22, locks the reel 11 to the shaft 22 and also acts as an anchor for the line 13, as clearly illustrated in Fig. 4. It is to be observed that the peripheries of the flanges 26 of the reels 11 are in such close proximity to the inside wall of the body 10 as to enable the latter to prevent displacement of the lines 13 from their reels. The shaft extension 33 carries a crank 34 for rotating the shaft and its spaced reels.

The line spooling guide 12 may be in the form of a bar 35 carried by the body section 16 and provided with line passing openings 36 spaced in the same relation as the reels 11. Section 16 may be provided with a longitudinally arranged projection 37 extending outwardly from the contour of the curved section 16 to slidably receive the bar 35 for translation. Slots 38 are provided in the outer wall of the projection 37 opposite each reel in register with openings 36 in the bar 35, and are elongated a distance substantially equal to the width of the reel to provide longitudinal shifting of the line while being wound on the reel 11. The openings 36 and slots 38 are perferably located at a horizontal tangent to the bottom windings of each reel.

The line spooling mechanism further includes means for translating the guide to insure uniform winding of the several lines 13, and includes generally a toothed wheel 39 carried by a bracket 40 extending transversely through the body section 16 and secured thereto by spot welding or the like. The wheel 39 is provided with a hub 41 rotatably supported on pin 42 carried by bracket 40. The periphery of the wheel 39 has a cylindrical flange portion 43 with serrations or teeth 44 for cooperation with a rotating projection or part 45 carried on the shaft 22. Rotation of the shaft 22 and part 45 fixed thereon engages teeth 44 of the wheel 39 during a portion of their revolution to impart a partial revolution to the wheel 39.

The line spooling guide includes means for transmitting rotation from the wheel 39 to reciprocation of the guide rod 35, and includes a link 46 having one end rotatably carried on an eccentric pin 47 fixed to the wheel 39 and its other end pivotally connected at 48 with the bar 35. It readily will be understood from the foregoing how rotation of the wheel 39 imparts translation to the bar 35 through the connection link 46. Translation of the guide bar 35 simultaneously shifts the several lines 13 on their reels 11 to insure a uniform winding on the several reels.

A body 10 and its plurality of line carrying reels 11 is mounted in a horizontal plane and supported centrally by a post 49 to be spaced from the ground, while the ends of the lines 13 are anchored to a horizontal bar 50 releasably connected at the upper end of a post 51 at a point remote from the post 49. The bar 50 is received in a horizontal slot 52 at the upper end of the post. A vertical line passing slot 53 intersects the slot 52 and provides a releasable connection for the bar 50 and its lines 13.

Ratchet means 54, provided in connection with the rotating shaft 22 for preventing unwinding of the shaft in a reverse direction, includes a ratchet wheel 55 fixed to the shaft 22 and engageable by pawl 56 pivoted to the end plate 14 by pin 57. The pawl 56 has a projection 58 extending through a slot 59 in the body section 16 for releasing the pawl 56 from the wheel 55 to allow reverse rotation of the reels 11 permitting unspooling of the lines 13. A suitable latch provided for holding the pawl 56 disengaged from its wheel 55, may comprise a leaf spring 60 carried by the end plate 14 of the body section 16 for frictionally holding the pawl 56 released.

In operation, the lines 13 as normally wound on their reels 11 are protected by the body housing 10 against deterioration and stored in the housing 10 until it is desired to use them. Being attached to the bar 50, the lines are simultaneously withdrawn from the housing 10 while the pawl 56 is in its released condition, and the bar is inserted in the slot 52 of post 51 remote from the body 10. The pawl 56 is again engaged with the wheel 55 and the user may turn the crank 34 in a winding direction to tighten the lines to the desired degree. The pawl, cooperating with the wheel 55, will retain the tension on the lines.

After the lines have been used and it is desired to house them on their reels, the user releases pawl 56 from its wheel 55 to relieve the tension on the lines for disengagement of bar 50 from post 51, and the lines are simultaneously wound by rotation of the crank. Rotation of the shaft 22 by the crank brings projection 45 carried by the shaft 22 into engagement with the teeth 44 on the wheel 39 to transmit partial rotations thereto. Rotation of the wheel 39 through the link 46 causes translation of guide bar 35 and simultaneous shifting of the lines 13 on their respective reels 11 producing a uniform winding of the several lines 13 and resultant simultaneous finish.

I claim:

1. A clothesline reel comprising, a housing having a hinged body section containing line passing openings, rotatable means for simultaneously winding a plurality of lines mounted in said housing, and means responsive to rotation of said rotatable means for uniformly winding said lines including, a line guide engaging said lines and mounted in said body section for translation, and means operable by rotation of said rotatable means for translating said line guide.

2. A clothesline reel comprising, a housing, rotatable means for simultaneously winding a plurality of lines mounted in said housing, and means responsive to rotation of said rotatable means for uniformly winding said lines including, a line guide engaging said lines and mounted for translation, a toothed wheel mounted for rotation at right angles to the axis of rotation of the rotatable means, a part carried by said rotatable means for engaging said wheel for intermittently rotating said wheel, and a connecting rod between said wheel and said line guide for translating said line guide.

3. A clothesline reel comprising a cylindrical housing having end walls and split axially into two sections, one a body section and the other a cover section, an axial shaft rotatably carried by said end walls, a plurality of line reels secured to said shaft in spaced relation with their peripheries in such close proximity to the cylindrical wall of the housing as to retain the lines on the reels, a line guide engaging said lines and carried by the body section for translation for uniformly winding the lines on said reels, and means responsive to rotation of the shaft for translating said guide.

4. A clotheslines reel comprising a cylindrical housing having end walls and split axially into two sections, one a body section and the other a cover section, the body section having a plurality of line passing openings, an axial shaft rotatably carried by said end walls, a plurality of line reels secured to said shaft in spaced relation with their peripheries in such close proximity to the cylindrical wall of the housing as to retain the lines on the reels, a line guide engaging said lines and carried by the body section adjacent said line passing openings for translation for uniformly winding the lines on said reels, and means responsive to rotation of the shaft for translating said guide.

5. A clothesline reel comprising a cylindrical housing having end walls and split axially into two sections, one a body section and the other a cover section, an axial shaft rotatably carried by said end walls, a plurality of line reels secured to said shaft in spaced relation with their peripheries in such close proximity to the cylindrical wall of the housing as to retain the lines on the reels, a line guide engaging said lines and carried by the body section for translation for uniformly winding the lines on said reels, and means responsive to rotation of the shaft for translating said guide including a toothed wheel carried by the body section for rotation at right angles to said shaft, a part rotatable by said shaft for imparting partial rotation to said wheel, and a connecting rod between said wheel and said guide for translating the latter.

6. A clothesline reel comprising a cylindrical housing having end walls and split axially into two sections, one a body section and the other a cover section, an axial shaft rotatably carried by said end walls, a plurality of line reels secured to said shaft, a guide engaging said lines and carried by the body section for translation to uniformly wind the lines on said reels, and means responsive to rotation of the shaft for translating said guide.

7. A clothesline reel comprising a housing, rotatable means for simultaneously winding a plurality of lines mounted in said housing, and means responsive to rotation of said rotatable means for uniformly winding said lines including, a guide engaging said lines and mounted for translation, a toothed wheel mounted for rotation, a part carried by said rotatable means engaging said wheel to intermittently rotate said wheel, and a connecting rod between said wheel and said line guide for translating said line guide.

LEO RAYMOND WHITE.

REFERENCES CITED

The following references are of record in the file of this patent:

UNITED STATES PATENTS

| Number | Name | Date |
| --- | --- | --- |
| 964,993 | Mader | July 19, 1910 |
| 969,598 | Buttles | Sept. 6, 1910 |
| 1,378,686 | Krizevicius | May 17, 1921 |
| 1,433,412 | Playle | Oct. 24, 1922 |
| 1,493,436 | Kubista | May 6, 1924 |
| 1,581,289 | Prihoda | Apr. 20, 1926 |
| 2,206,174 | Falk | July 2, 1940 |